April 25, 1961   G. E. KLOOTE ET AL   2,980,972
JOINT FOR LOW DENSITY LAMINATED SYNTHETIC RESIN PANELS
Filed Feb. 2, 1956
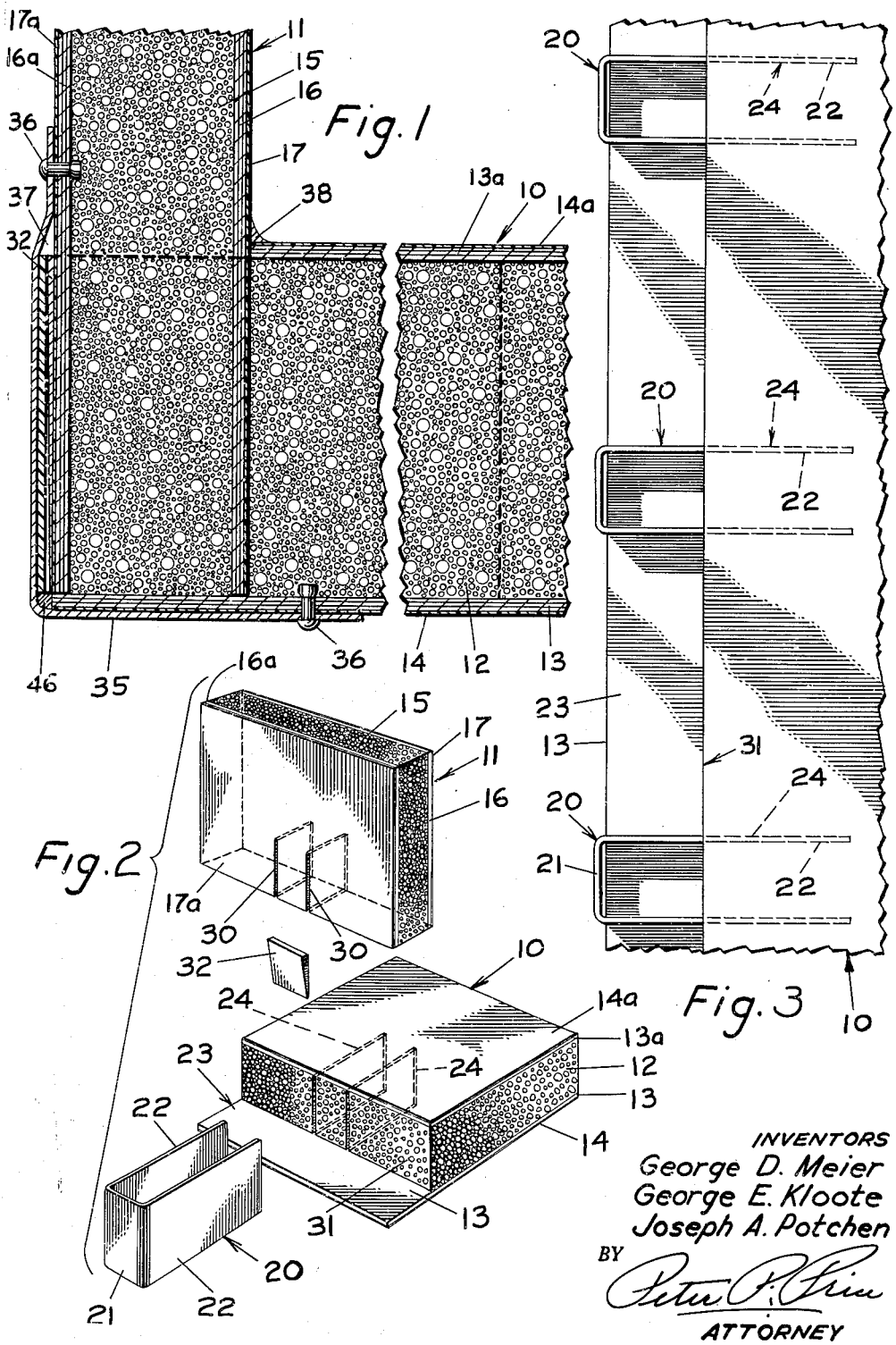
INVENTORS
George D. Meier
George E. Kloote
Joseph A. Potchen
BY
ATTORNEY

United States Patent Office 2,980,972
Patented Apr. 25, 1961

2,980,972

JOINT FOR LOW DENSITY LAMINATED SYNTHETIC RESIN PANELS

George E. Kloote, Grand Rapids, Joseph A. Potchen, Marne, and George D. Meier, Grand Rapids, Mich., assignors, by mesne assignments, to Evans Products Company, Plymouth Township, Mich., a corporation of Delaware Filed Feb. 2, 1956, Ser. No. 562,994

4 Claims. (Cl. 20—92)

This invention relates to the making of a structural joint between light weight laminated panels with the express object of providing a concealed, high strength joint.

The problem of joining low density, light weight, structural panels, particularly those having a cellular, synthetic resin core, presents a number of problems. Such core materials are characterized by low strength under tension loading but relatively high strength under shear loading. Consequently, one of the objectives in designing a joint for such panels is to transfer the loadings across the joint in shear rather than in tension. This invention accomplishes that purpose.

Not only does this invention provide a joint in which the transmitted loads operate in shear rather than in tension, it provides a joint capable of withstanding multi-directional loadings. Thus, loads applied to the joint, whether they tend to pull the joint apart, to break the joint by pivoting one panel away from the other or by loads tending to slide one panel relative to the other, the stresses at the joint are expressed in shear when transmitted to the core.

This invention has the further advantage of utilizing relatively inexpensive components, since the main anchor members used to form the joint are designed to be cut from long lengths of appropriately formed material. The necessity for individual forming of each anchor member is eliminated. The joint is adapted to rapid installation. In the event subsequent repairs are necessary, this also may be done rapidly without the use of special tools. The joint has the advantage of being adapted to concealment, whereby it does not detract from the ornamental appearance of the structure on which it is used. The joint is so designed that it creates its own pressure for causing the panels to tightly abut each other. The necessity for special jigs, clamps or other pressure creating tools is eliminated. This speeds the assembly operation and materially reduces its cost.

These and other objects and purposes of this invention will be immediately seen by those acquainted with the problems of joining light weight, laminated panels upon reading the following specification and the accompanying drawings.

In the drawings:

Fig. 1 is a fragmentary, sectional view of a joint incorporating this invention.

Fig. 2 is an exploded view of the joint illustrated in Fig. 1.

Fig. 3 is a plan view of the abutting panel showing the anchor members in place prior to the installation of the lapping panel.

In the following description, the terms "inwardly" and "outwardly" are frequently used. The term "inwardly" is to be taken to mean toward the abutting panel or to the right in Fig. 1 and "outwardly" the opposite thereof.

"Upwardly" and "downwardly" are also used and are to be taken to mean as being in the direction the panels are shown in Fig. 1.

The use of these terms as referring to directions in which these panels or joints are oriented is for convenience only and is not to be considered a limitation inasmuch as this joint may be applied in any position. The axis of the joint may be horizontal, vertical or inclined and at either the top or bototm or any other position in the resulting structure.

Referring specifically to the drawings, the numeral 10 indicates the abutting panel and the numeral 11 the lapping panel. For the purposes of illustration, these panels may be considered to be of identical construction. This condition, however, is not a limitation since the panels may be of various constructions and of various types of laminations, of various thicknesses and may be made from various types of materials without departing from the principles of this invention.

The abutting panel 10 has a low density, cellular core 12 to each face of which is bonded a rigid sub-lamina 13. The sub-lamina on the bottom being identified as 13 and on the top as 13a. The sub-laminae 13 and 13a are enclosed by a facing sheet 14 and 14a respectively. The facing sheets 14 and 14a are firmly bonded to the sub-laminae so that the entire group of laminae form a single, rigid, structural, integral panel.

The lapping panel 11 has a low density, cellular core 15 to each face of which is bonded a rigid sub-lamina 16, the inner one being identified as 16 and the outer one as 16a. To the exposed faces of the sub-laminae 16 and 16a there is bonded a facing skin 17 and 17a respectively.

The various laminae from which the panel is built up may be of many different materials. The particular material selected will depend upon the purposes and requirements of the particular application for which the resulting structure is designed. Therefore, the following description of the materials should be considered as illustrative rather than limiting of the characteristics of the panels to which this invention may be applied.

The core 12 may be of any suitable type of light weight, low density, cellular material. One such material is a foamed polystyrene such as those made by polymerizing a hydrocarbon or halo-hydrocarbon having a vinyl radical on an aromatic nucleus and including the products resulting from polymerization of styrene, monomethylstyrene and di-methylstyrene, vinylnaphthalene and a halogenated styrene. Such foamed core materials normally have a density in the range of 2 to 10 lbs. per cubic foot. The core may be of a foamed in situ, reaction product of a polyisocyanate and a suitable polyester or alkyd resinous composition. An example of such a polyisocyanate is a meta-toluene-diisocyanate. This latter is but an exemplification because other aromatic polyisocyanates can be employed quite satisfactorily.

The facing skins 14 and 14a are of a hard, impervious, resin material which may be securely bonded to the sub-laminae 13 and 13a by any suitable resin characterized by adhesive properties and in which the facing sheet is not readily soluble. A suitable resin for manufacture of the facing sheets is one of the numerous, commercially available polyester resins. The facing sheet is normally reinforced with a fibrous material such as filamentary glass in which the filaments are either oriented or arranged at random. Such facing sheets, when cured, have a thickness normallly within the range of 0.015 to about 0.060 of an inch. The facing sheets 14 and 14a may be of the same thickness or they may be of different thicknesses, depending upon the particular requirements of the installation in which the structure is to be used.

The sub-laminae 13 and 13a are of high density and normally are applied to increase the panel's resistance to surface indentation such as would be caused by crushing loads or high impact forces. While the low density core materials, particularly the foamed, synthetic, resin materials of the inner core 12, have sufficient resistance to crushing loads for many applications, their failure point, in compression, is below that necessary where the panels are applied as flooring or where heavy or sharp objects are likely to strike the panel with appreciable force. As applied in these panels, the high density laminae 30 serve both to resist penetration by such forces and to distribute concentrated loads over a wide area so that the ultimate compressive strength of the low density cores 12 and 15 is not reached.

The sub-laminae 13 and 13a may be of a high density, foamed polystyrene or a high density, foamed, polyisocyanate or they may be of a totally different material such as plywood or a ligneous hardboard such as that sold under the trademark "Masonite." Other possible materials for a puncture resisting, sub-laminae include the fibrous hardboards such as panels consisting of mineral fibers bonded with a synthetic resin or a cementitious binder.

The tendency of some of these materials to absorb moisture is immaterial in a panel of this type since the surface skins 14 and 14a are moisture impervious and non-hygroscopic and serve as a protective shell against moisture contact with the sub-laminae.

The surface skins 14 and 14a are bonded to the sub-laminae 13 and 13a respectively by a suitable adhesive. In similar manner, the sub-laminae 13 and 13a are bonded to the surfaces of the core 12. While it is not essential that the same adhesive be used for all of these bonds, this procedure may be followed, if desired.

A suitable adhesive for this purpose is an epoxy resin adhesive hardenable at ambient or moderately elevated temperatures and under only sufficient pressure to assure firm contact between the facing sheet and the core during the curing period. This adhesive is a liquid partially polymerized, high molecular weight, reaction product of a diphenol and an epoxy compound. One example of such a reaction product is that obtained by heating together 2,2'-bi (4-hydroxyphenyl)-propane and epichlorhydrin in the presence of an alkali such as sodium hydroxide, whereby there are formed polymeric glycidyl polyethers of the phenolic substance having properties and an average molecular weight depending upon the reaction conditions and the proportions of the reactants employed. This is merely an example of one particular adhesive and it will be recognized that various other materials may be used without in any way affecting this invention.

For the purpose of bonding together the various laminae of the panels, contact adhesives may be used as substitutes for the epoxy type adhesive resins. The contact adhesives used for this purpose must be of a type which will adhere strongly to themselves even after evaporation of the carrier, whether it is water or a solvent.

Among suitable contact type adhesives for this purpose is D-253-20 sold by Armstrong Cork Co. This is a synthetic rubber base material containing a solvent and methyl-ethyl-ketone. Another suitable contact adhesive is EC-971 sold by Minnesota Mining and Manufacturing Co. The latter is a water dispersion type of adhesive. Other usable contact adhesives include Nos. 871 and 321 all sold by Minnesota Mining and Manufacturing Co. and the adhesive EC-1390 manufactured by the same company. This latter adhesive has a solvent carrier. These are but exemplary of the contact adhesives which may be used for this purpose.

The above description of the structure and materials employed in the abutting panel 10 is equally applicable to the lapping panel 11, both as to its general structure and as to the corresponding components of the lapping panel. It will be recognized that while in this description both the abutting panel 10 and the lapping panel 11 are illustrated and described as being of identical construction except for their thickness, that this is merely illustrative and this invention encompasses those situations and structures in which the panels are of substantially different construction.

The means by which the basic loads are transmitted from one panel to the other is a spline or anchor member 20. While this anchor member may have many forms, in the preferred form illustrated, it is a U-shaped clip or element having a web 21 and a pair of legs 22. The height of the anchor member 20 is determined by the thickness of the core material of the panel into which it is to be inserted. In the illustrated form, it is inserted into the abutting panel 10 and therefore has a height equal to the thickness of the core 12. The length of the legs 22 of the anchor member 20 is dependent upon two factors, these are: the thickness of the lapping panel 11 through which the anchor member passes and the depth of penetration of the abutting panel 10 necessary to provide a shear load absorbing area of bonded contact with the core 12 sufficient to absorb the expected operating loads of the joint.

The anchor members may be of any suitable material. A preferable material for the anchor members is a filamentary glass reinforced, polyester, synthetic resin. The anchor members can be made of the identical material and substantially in the same way as the facing skins 14 and 14a except that they will normally be substantially thicker. A thickness of 0.125 of an inch has been found suitable for many applications. However, any thickness sufficient to provide adequate tensile strength will serve the purpose.

To increase the strength of the joint, to provide a positive stop for the lapping panel 11 as it is installed, to protect the exposed edge of the core of the lapping panel and to generally provide a neater joint, the edge of the abutting panel 10 is cut away to leave a projecting shelf 23 consisting of the lower facing laminae of the abutting panel. In this operation, all of the abutting panel in the area of the cut out is removed except the lower facing skin 14 and the lower sub-lamina 13. The depth of the cut out in the abutting panel is equal to or substantially equal to the thickness of the lapping panel 11. It will be recognized that the abutting panels may be initially fabricated with this shelf, eliminating the necessity for a subsequent cutting operation.

To prepare the abutting panel 10 for installation of an anchor member 20, a pair of parallel slots 24 are formed in the core material 12 (Fig. 2). The slots 24 may be formed in any suitable manner such as by cutting with a sharp instrument or by routing or with a heated element. The depth of the slots 24 is determined by the depth of penetration of the anchor member 20 necessary to provide sufficient strength for the particular application. The spacing between the slots is such that the legs 22 of the anchor member will align with them and slide into them without interference. The method of forming the slots must be such as not to crush or otherwise distort the core material 12 in the area of the slots. To permit such distortion or crushing will result in a substantial decrease in the strength of the joint. The slots 24 are formed in the core 12 only and are not cut into either the facing skins 14 and 14a or the sub-laminae 13 and 13a.

After the slots 24 have been formed, the legs 22 of the anchor member 20 are coated with a suitable adhesive. A preferable adhesive for this purpose is an epoxy resin of the type described above as used for bonding the facing skins 14 and 14a and the sub-laminae 13 and 13a. However, it is desirable in this case to increase the viscosity of the adhesive. This is normally done by the addition of an extender. Many materials are suitable as extenders including calcium carbonate, magnesium silicate, aluminum silicate, silica and diatomaceous earth.

The extender may consist of any one of these materials used alone or, more commonly, a mixture of them.

One result of the use of these extenders is a material increase in the viscosity of the adhesive. This permits it to be spread as a paste-like substance on the legs 22 of the anchor member 20 or introduced into the slots 24 without danger of appreciable flow or run before the anchor member is inserted. After the adhesive has been applied, the legs are inserted into the slots 24. As the legs are introduced, the adhesive in the slots 24 is squeezed outwardly along the legs, forming a complete film between the legs and the walls of the slots. This assures a firm bond of maximum strength.

If the slots are carefully cut, the anchor member should be inserted to the full depth of the slots. In any case, the anchor member should be inserted until its web 21 is almost even with the outer edge of the shelf portion 23 of the abutting panel 10 (Fig. 3). This provides sufficient room between the edge 25 of the abutting panel and the web to receive the lapping panel 11.

Before the lapping panel 11 is assembled to the abutting panel 10 and the anchor member 20, it is preferable to allow sufficient time for the adhesive applied to the legs 22 of the anchor member 20 to set. This provides sufficient anchorage for the anchor member that it will not have a tendency to withdraw from the slots 24 when the wedges 32 are applied.

To prepare the lapping panel 11 for installation, a pair of channels 30 are cut through the panel, opening through the edge of the panel designed to seat against the shelf 23 of the abutting panel. The channels 30 are so spaced that they align with the legs 22 of the anchor member 20 and are of just sufficient height to receive the anchor member 20. The channels 30 may be formed in the same manner as the slots 24 in the abutting panel 10.

Before the panels 10 and 11 are assembled, the vertical face 31 of the abutting panel and the top surface of the shelf portion 23 are coated with the same adhesive as that applied to the anchor member 20. When this has been done, and before the adhesive sets, the panels are assembled by passing the lapping panel 11 down over the anchor member 20 until it seats firmly on the shelf portion 23 of the abutting panel 10. A wedge 32 is then driven between the web 21 of the anchor member 20 and the exterior face of the lapping panel 11. This wedge forces the lapping panel 11 tightly against the face 31 of the abutting panel 10. This assures a strong, tight, adhesive joint between the panels.

The wedge 32 may be fabricated from any suitable material such as plastic, metal or wood. While the wedge is a simple and desirable way of assembling these panels, it will be recognized that it need not necessarily be used and that some type of clamping or other holding mechanism may be employed to hold the panels in firm contact while the adhesive sets. The strength of the joint may be increased by applying adhesive to the inside surface of the web 21 and the portion of the exterior face of the lapping panel 11 between the channels 30 before the wedge is driven. In this case sufficient adhesive is employed to fill the entire gap between the web 21 and the exterior face of the lapping panel, creating a secure, load carrying bond.

Once the panels have been assembled and the wedges 32 driven, the exterior portion of the joint may be enclosed by a suitable angle member 35. The angle member is designed to extend beyond the top of the wedge 32 and the anchor member 20 and to be offset so that its upper portion seats firmly against the exterior face of the lapping panel 11. The lower portion of the angle member 35 wraps around the corner of the panel joint and extends under and lies against the lower face of the abutting panel 10. The angle member 35 may be of any suitable material such as a fiber, reinforced, synthetic resin such as that used for the facing skins 14 and 14a or the anchor member 20. The angle member, with equal utility, may be metallic such as aluminum or steel of any of the many alloyed types. Its thickness will depend upon whether it is to serve merely as a means of concealing the joint or as a primary load carrying member.

Before the angle member 35 is installed, its inner face may be coated with the same adhesive as that used for making the joint between the panels. It is then pressed tightly against the exterior surfaces of the panels. To eliminate the necessity for providing clamps or jigs to hold the angle member 35 in place while the adhesive sets, it may be attached to both panels by suitable, blind rivets 36. In this case, the rivets 36 serve no structural purpose, their function being completed once the adhesive has set.

In some cases the adhesive may be omitted and the rivets alone used as the attachment means. In this case, an adhesive or caulking material should be applied to the top end of the angle to seal it against moisture. It will be recognized that under proper circumstances any other suitable fastening means could be substituted for the rivets without in any way adversely affecting the resulting joint.

To increase the strength of the joint and to prevent access of moisture to the sub-laminae of the panels, particularly when these are of a hygroscopic material, the gap at the apex of the angle is occupied by a fillet 46 of the adhesive resin. In a similar manner, the gap 37 created by the offset in the angle 35 may be filled. To positively seal the interior line of contact between the panels, a fillet 38 of the epoxy type, adhesive resin is applied.

In a normal structure, a quantity of the anchor members 20 are employed. The spacing between them will be determined by the size of the anchor member which in turn is controlled by the thickness of the panels involved and the maximum load it is expected the joint will have to withstand. This type of joint, once the adhesive has set, develops the ability to transmit and withstand high load factors.

The load carrying capacity of joints of this type is illustrated in the following examples.

EXAMPLE I

The following figures are based upon anchor members used at 9 inch center to center spacings. In all cases the anchor members have a span or width between the legs of 2 inches. The height of the anchor member is, of course, dependent upon the thickness of the core material of the abutting panel. For the purpose of these figures, the joint was made with an epoxy type resin containing calcium carbonate and silica extenders. This adhesive, when bonded to foamed polystyrene having a density of 2 pounds per cubic foot, develops, at normal room temperature, an ultimate strength in shear of 43 pounds per square inch. This figure has been determined by tests in which a piece of filamentary glass reinforced polyester resin sheet was bonded to the foamed polystyrene by an epoxy resin. The assembly was subjected to tension loading parallel to the longitudinal axis of the strip until failure occurred as a result of rupture of the polystyrene adjacent the bond. The figures in the following table are the values developed for one anchor member plus the seven inch span of bonded contact between the lapping and abutting panels from the anchor member to the next anchor member, that is, one 9 inch unit of joint when the load is applied parallel to the lapping panel. The contribution to the joint's strength made by resistance of the flange portion 23 to deflection and delamination from the abutting panel is disregarded in these figures. It is considered that no adhesive is applied in the area of the wedge 32. No value is given to any strength contributed by the angle member 35.

Table I

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 559 | 1,118 | 1,677 | 2,236 | 3,354 |
| 2 | 731 | 1,462 | 2,193 | 2,924 | 4,386 |
| 3 | 903 | 1,806 | 2,709 | 3,612 | 5,418 |
| 4 | 1,075 | 2,150 | 3,225 | 4,300 | 6,450 |
| 6 | 1,419 | 2,838 | 4,257 | 5,676 | 8,514 |

[1] Expressed in inches.
[2] Figures are maximum load, expressed in pounds, carried by a joint of 9 inches length.

EXAMPLE II

The calculations appearing in the following table are based upon the same criteria as that of Example I. However, this table expresses the load carrying capacity of the joint in terms of linear feet of joint. Each figure represents the load carrying capacity of one foot of the joint.

Table II

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 745.3 | 1,490.7 | 2,236 | 2,981.3 | 4,472 |
| 2 | 974.7 | 1,949.3 | 2,924 | 3,898.7 | 5,848 |
| 3 | 1,204 | 2,408 | 3,612 | 4,818 | 7,224 |
| 4 | 1,433.3 | 2,866.7 | 4,300 | 5,433.3 | 8,600 |
| 6 | 1,892 | 3,784 | 5,676 | 7,568 | 11,352 |

[1] Expressed in inches.
[2] Figures are maximum load, expressed in pounds, carried by a joint of 1 foot length.

EXAMPLE III

The figures appearing in the following table are based upon the identical values as those expressed in Example I except that the center to center spacing between the anchor members is 6 inches instead of 9 inches.

Table III

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 430 | 860 | 1,290 | 1,720 | 2,580 |
| 2 | 602 | 1,204 | 1,806 | 2,408 | 3,612 |
| 3 | 774 | 1,548 | 2,322 | 3,096 | 4,644 |
| 4 | 946 | 1,892 | 2,838 | 3,784 | 5,676 |
| 6 | 1,290 | 2,580 | 3,870 | 5,160 | 7,740 |

[1] Expressed in inches.
[2] Figures are maximum load expressed in pounds carried by a joint of 6 linear inches.

EXAMPLE IV

The following table is based upon the same values as that of Example III except that the load carrying capacity of the joint is expressed in terms of one linear foot of joint.

Table IV

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 860 | 1,720 | 2,580 | 3,440 | 5,160 |
| 2 | 1,204 | 2,408 | 3,612 | 4,816 | 7,224 |
| 3 | 1,548 | 3,096 | 4,644 | 6,192 | 9,288 |
| 4 | 1,892 | 3,784 | 5,676 | 7,568 | 11,352 |
| 6 | 2,580 | 5,160 | 7,740 | 10,320 | 15,480 |

[1] Expressed in inches.
[2] Figures are maximum load expressed in pounds carried by a joint per linear foot.

EXAMPLE V

The following table is based upon the same values as Table I except that the loads are considered as being applied to the joint parallel to the abutting panel. Again, the joint is considered as though the wedge 32 had been omitted and no value has been assigned to any contribution which might be made by the fact that one face of the lapping panel is bonded to the face 31 of the abutting panel. This latter portion of the joint will act in tension.

Table V

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 559 | 731 | 903 | 1,075 | 1,419 |
| 2 | 1,118 | 1,462 | 1,806 | 2,150 | 2,838 |
| 3 | 1,677 | 2,193 | 2,709 | 3,225 | 4,257 |
| 4 | 2,236 | 2,924 | 3,612 | 4,644 | 5,676 |
| 6 | 3,374 | 4,406 | 4,922 | 6,126 | 7,502 |

[1] Expressed in inches.
[2] Figures are maximum load, expressed in pounds, carried by a joint of 9 inches length.

EXAMPLE VI

The calculations appearing in the following table are based upon the same criteria as that in Example V. However, this table expresses the load carrying capacity of the joint in terms of linear feet of joint. Each figure represents the load carrying capacity of one foot of the joint.

Table VI

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 745.3 | 974.7 | 1,204 | 1,433.3 | 1,892 |
| 2 | 1,490.7 | 1,949.3 | 2,408 | 2,866.7 | 3,784 |
| 3 | 2,236 | 2,924 | 3,612 | 4,300 | 5,696 |
| 4 | 2,981.3 | 3,772 | 4,816 | 6,192 | 7,701.3 |
| 6 | 4,498.7 | 5,874.7 | 7,224 | 8,168 | 10,002.7 |

[1] Expressed in inches.
[2] Figures are maximum load, expressed in pounds, carried by a joint of 1 foot length.

EXAMPLE VII

The figures appearing in the following table are based upon the identical values as those expressed in Example V except that the center to center spacing between the anchor members is six inches instead of nine inches.

Table VII

| Thickness[1] of lapping panel | Thickness[1] of core of abutting panel (height of anchor members) | | | | |
|---|---|---|---|---|---|
| | 1″ | 2″ | 3″ | 4″ | 6″ |
| 1 | [2] 430 | 602 | 774 | 946 | 1,290 |
| 2 | 860 | 1,204 | 1,548 | 1,892 | 2,580 |
| 3 | 1,290 | 1,806 | 2,322 | 2,838 | 3,870 |
| 4 | 1,720 | 2,408 | 3,096 | 4,128 | 5,160 |
| 6 | 2,580 | 3,612 | 4,128 | 5,332 | 6,708 |

[1] Expressed in inches.
[2] Figures are maximum load, expressed in pounds, carried by a joint of 9 inches length.

EXAMPLE VIII

The figures appearing in the following table are based upon the same values and conditions as those of Example VII except that the load carrying capacity of the joint is expressed in terms of linear feet of joint. Each figure represents the load carrying capacity of one foot of the joint.

*Table VIII*

| Thickness [1] of lapping panel | Thickness [1] of core of abutting panel (height of anchor members) | | | | |
|---|---|---|---|---|---|
| | 1″ | 2″ | 3″ | 4″ | 6″ |
| 1 | [2] 860 | 1,204 | 1,548 | 1,892 | 2,580 |
| 2 | 1,720 | 2,408 | 3,096 | 3,784 | 5,160 |
| 3 | 2,580 | 3,612 | 4,644 | 5,676 | 7,740 |
| 4 | 3,440 | 4,816 | 6,192 | 9,256 | 10,320 |
| 6 | 5,160 | 7,224 | 8,256 | 10,664 | 13,416 |

[1] Expressed in inches.
[2] Figures are maximum load, expressed in pounds, carried by a joint of 1 foot length.

EXAMPLE IX

For the purpose of determining the figures appearing in the following table the same conditions and values were used as in Example I. However, this table expresses the load carrying capacity of the joint per linear foot when the load is applied parallel to the axis of the joint. This type of loading, at failure, will result in sliding of the panels relative to each other. In computing these values, no value was assigned to the strength of the anchor members in shear since this would have introduced the complex factor of the ultimate values in bearing of the core materials when the bearing load may be unevenly distributed along the length of the anchor members due to bending.

*Table IX*

| Thickness [1] of lapping panel | Thickness [1] of core of abutting panel (height of anchor members) | | | | |
|---|---|---|---|---|---|
| | 1″ | 2″ | 3″ | 4″ | 6″ |
| 1 | [2] 1,032 | 1,548 | 2,064 | 2,580 | 3,612 |
| 2 | 1,548 | 2,064 | 2,580 | 3,096 | 4,128 |
| 3 | 2,064 | 2,580 | 3,096 | 3,612 | 4,644 |
| 4 | 2,580 | 3,096 | 3,612 | 4,128 | 5,160 |
| 6 | 3,612 | 4,128 | 4,644 | 5,144 | 6,192 |

[1] Expressed in inches.
[2] Figures are maximum load expressed in pounds, carried by a joint of 1 foot length.

It will be noted that in each case it has been assumed that the joint will fail in shear before the anchor member fails in tension or shear. This assumption is based upon the strength of an anchor member of cured polyester resin having embedded therein a reinforcement of woven filamentary glass. This material has an ultimate tensile strength of 40,000 p.s.i. and ultimate shear strength of 18,000 p.s.i. Thus, the two legs of an anchor member of 0.125 of an inch thickness and one inch in height will have an ultimate tensile strength of 10,000 pounds and an ultimate shear strength of 4,500 pounds. Where the anchor member has a height of 6 inches, these values will be 60,000 pounds in tension and 27,000 pounds in shear.

It has also been assumed that the joint between the abutting panel and the legs of the anchor members will withstand the loads imposed in tension on the anchor members. This assumption has been made since the depth of penetration of the abutting panel by the anchor members is a matter of choice and can be predetermined to develop the area of bond necessary to sustain the required loads.

Should it become necessary at any time to repair a joint of this type for any reason such as damage to one of the panels, the panels may be separated simply by cutting them apart at the joint. In this operation the anchor members 20 are, of course, severed at the edge face 31 of the abutting panel. The original anchor members thus destroyed are replaced by new ones installed in the same manner as the original ones but offset from the original ones so that they will be bonded to the core of the abutting panel intermediate the legs 22 of the original anchor members remaining in the abutting panel after separation of the panels. The installation of the repair panel proceeds in the same manner as the original assembly of the panels. It will be seen that this arrangement provides a moisture tight, rigid joint for this type of panel which will not come apart even under severe loading.

The stresses occurring at the joint are largely converted to shear loadings and thus the joint develops the best load carrying characteristics of the low density, synthetic, resin core material, avoiding the difficulties encountered when this material is placed in tension. The conversion of the loadings from tension to shear multiplies the strength of the joint many times and gives it a substantially increased resistance to vibration or any type of repeated or cycler loading of the type frequently causing failure of the low density, synthetic resin materials when the loads are applied in tension.

It will be recognized that the loads which will be applied to the joint under many operating conditions will be combinations of the types of loads for which values are expressed in the Tables I through IX. However, the values cover forces acting in a three dimensional scheme along the X, Y and Z axes. Thus, irrespective of the directional character of the load factor, it will be understood that the invention provides a high load transmitting joint.

It will be understood that while a U-shaped anchor member is shown and illustrated as the preferred form of this invention that this invention is not to be considered as limited specifically to U-shaped anchor members. It will be recognized that under certain conditions a T-shaped, L-shaped or other type of anchor member may be used without departing from the spirit of this invention. These and other modifications of this invention are to be taken as included in the hereinafter appended claims unless these claims by their language expressly state otherwise.

We claim:

1. A joint for a pair of panels each having a low density synthetic resin core and a pair of facing sheets, one on each of the surfaces of said core which comprises a U-shaped spline, the free ends of said spline being embedded in and adhesively secured to the core of one of said panels, said spline projecting from one edge of said panel, a pair of parallel slots through the core and facing sheets of the other of said panels, the portions of said legs exterior of said one panel being received into said slots in said second panel and adhesively secured to the walls of said slots.

2. A joint for a pair of panels with the edge of one abutting the face of the other, said panels each having a low density synthetic resin core and facing sheets on the side surfaces thereof which comprises a U-shaped spline having a web at one end, the free ends of said spline being embedded in and adhesively secured to the core of one of said panels, said spline projecting from one edge of said panel, a pair of parallel slots through the core of the other of said panels, the portions of said legs exterior of said one panel being received into said slots in said second panel and adhesively secured to the walls of said slots, and a wedge element adhesively secured to said web and the face of said other panel.

3. A joint for a pair of panels arranged with the edge of one abutting the face of the other, said panels each having a low density synthetic resin core and facing sheets on the exterior surfaces thereof comprising one of said panels having the facing sheet thereof adhesively bonded to the edge of the other of said panels, a spline having a laterally projecting member on one end, the other end of said spline being embedded in and adhesively secured to the core of said one panel, said spline projecting from said edge of said one panel, a slot through the core and facing sheet of said other panel, said slot opening through one edge of said other panel, and said portion of said spline exterior of said one panel being received into said slot and adhesively bonded to the walls thereof.

4. A joint for a pair of panels arranged with the edge of one abutting the face of the other, said panels each having a low density synthetic resin core and facing sheets on the exterior surfaces thereof comprising one of said panels having the facing sheet thereof adhesively bonded to the edge of the other of said panels, one facing sheet of the other of said panels projecting beyond the edge of said panel, overlying the edge of said one panel and being adhesively bonded thereto, a spline having one end embedded in and adhesively secured to the core of said other panel, said spline projecting from said edge of said other panel, a slot through the core and at least one facing sheet of said one panel, said slot opening through one edge of said one panel, and said portion of said spline exterior of said other panel being received into said slot and adhesively bonded to the walls thereof.

References Cited in the file of this patent
UNITED STATES PATENTS

| | | |
|---|---|---|
| 163,559 | Wiswell | May 18, 1875 |
| 2,266,746 | Elmendorf | Dec. 23, 1941 |
| 2,641,029 | Trimmer | June 9, 1953 |
| 2,730,772 | Jones | Jan. 17, 1956 |
| 2,756,463 | Clements | July 31, 1956 |